Feb. 28, 1956 G. L. FREDENDALL 2,736,766

COLOR TELEVISION RECEIVERS

Filed Aug. 31, 1953 2 Sheets-Sheet 1

INVENTOR.
GORDON L. FREDENDALL

BY

ATTORNEY

Feb. 28, 1956 G. L. FREDENDALL 2,736,766

COLOR TELEVISION RECEIVERS

Filed Aug. 31, 1953 2 Sheets-Sheet 2

INVENTOR.
GORDON L. FREDENDALL

BY [signature]

ATTORNEY 2,736,766

COLOR TELEVISION RECEIVERS

Gordon L. Fredendall, Huntingdon Valley, Pa., assignor to Radio Corporation of America, a corporation of Delaware Application August 31, 1953, Serial No. 377,495

12 Claims. (Cl. 178—5.4)

This invention relates generally to television signal reception, and, more particularly, to improvements in color television receivers.

In a proposed subcarrier type color television system which is in accordance with the present color television signal specifications proposed by the National Television System Committee (NTSC), color information is conveyed by a color subcarrier. In the proposed system, for color information in a limited low frequency band, the color subcarrier is both phase and amplitude modulated to permit effective three-color reproduction of relatively large picture areas. For color information in a succeeding higher frequency band, the color subcarrier is constant in phase but modulated in amplitude to permit effective two-color reproduction of the relatively small color details of the picture. As a broad band brightness signal is transmitted along with the modulated color subcarrier, the finest picture detail is reproduced in black-and-white only.

In the aforementioned NTSC signal specifications, the frequency of the color subcarrier is set at 3,579,545 cycles per second. Further in accordance with the proposed signal specifications, the bandwidth of color signals for which the color subcarrier is both phase and amplitude modulated to permit three-color reproduction is effectively approximately 500 kc. To produce the phase and amplitude modulated subcarrier in this region the signal specifications provide for the modulation of two components of the subcarrier wave in phase quadrature.

The placing of the subcarrier frequency in the video frequency spectrum is essentially a matter of compromise dictated by such factors as the finite bandwidth between an assigned picture carrier frequency and the cooperating sound channel, and the practical limitation imposed thereby on the bandwidth available for double sideband utilization of the subcarrier, on the one hand, and visibility of the subcarrier in black-and-white reproductions, on the other hand. In conventional black-and-white television receivers the sound signal is kept out of the picture signal by providing sound rejection filters in the receivers, the upper frequency limit of the useful video channel being effectively set by the capability of these filters. It has been general practice, more or less, to achieve substantial relative attenuation of the sound carrier in the IF strip of the television receiver. Very sharp rejection filters such as crystal filters are not generally feasible for use in sound rejection in the IF band, since the stability of the sound carrier at IF is dependent upon the local oscillator. Therefore, sound rejection at IF is generally not very sharp and a gradually sloping shoulder is usually obtained in the response characteristic of the IF strip for the higher video frequencies approaching the sound channel.

Color television receivers heretofore proposed have generally followed the technique of substantial sound rejection in the IF channel, thus having a similar sloping shoulder in the higher video frequency region of the IF response characteristic. At one time a color subcarrier frequency of approximately 3.89 mc. was proposed for the subcarrier type color television system. This frequency normally fell at the point of 50 per cent response of the conventional IF characteristic. There thus was a marked difference between the amplitudes of the respective upper and lower sidebands of the color subcarrier even for relatively low modulating frequencies, and operation was essentially single sideband. The result was undesirable color crosstalk with appreciable erroneous quadrature components. Under the present proposed NTSC signal specifications, however, the lowering of the subcarrier frequency to approximately 3.58 mc. has given sufficient room in the video frequency spectrum above the subcarrier to permit effective double sideband operation to at least a modulating frequency limit of 500 kc. While there is evidence with respect to the transition between effective three-color response and two-color response of the human eye which indicates that for color variations represented by signals above about 500 kc. sufficient informations may be carried by a single sideband of the color subcarrier to permit satisfactory color image reproductions, the more or less conventional manner of sound rejection at IF would still appear to be a prime practical factor in limiting the width of the double sideband region to this extent. Moreover, even with the color subcarrier at the lower frequency of 3.58 mc., in at least a portion of the double sideband region the response to corresponding upper and lower sidebands of the subcarrier will be of unequal amplitudes in receivers of the type having a "sloping shoulder" in the portion of the IF response characteristic approaching the sound carrier frequency.

The present invention is directed toward an improvement in color television receivers adapted to receive color television signals of the aforementioned subcarrier type, wherein a flat response characteristic is provided for sidebands of the color subcarrier up to an upper sideband frequency limit closely approaching the sound carrier. In accordance with the present invention a branched IF strip is provided for a color television receiver, the strip including a common portion having a response characteristic which is essentially flat through and including the sound carrier; a brightness channel portion having a response characteristic which provides the normal sound carrier attenuation with the "sloping shoulder" of the conventional black-and-white receiver characteristic; and a color channel portion having a response characteristic which also is essentially flat through and including the sound carrier. Thus, substantial sound rejection from the brightness channel is achieved at intermediate frequencies. Sound rejection in the color signal channel, however, is not effected at intermediate frequencies, but rather after detection, when a sharp rejection filter, such as a crystal filter or a regenerative trap, is feasible for use since frequency stability of the sound carrier is then dependent only on the separation of picture and sound carriers. A high level beat between color subcarrier and sound carrier may then be expected in the color channel due to the high level of response to both in the common and color channel portions of the IF strip. However, this beat is not passed to the color demodulators, since a color bandpass network is provided in the color channel, the network having a lower frequency cutoff appreciably above this beat frequency.

The present invention thus provides a color television receiver in which the response to both upper and lower sidebands of the subcarrier may be flat over a more extended frequency band than was heretofore possible. Double sideband operation up to an 800 kc. modulating frequency limit is therefore a practical possibility. Further, quadrature component distortion is greatly minimized even where double sideband operation has a modulating frequency limit of 500 kc. since unequal amplitude response to corresponding upper and lower sidebands of the color subcarrier is substantially avoided throughout the double sideband region.

A primary object of the present invention is therefore to provide an improved color television receiver.

A further object of the present invention is to provide a color television system of the subcarrier type with an improved color television receiver wherein color cross-talk is substantially avoided.

An additional object of the present invention is to provide an improved color television receiver which is provided with a response characteristic which is flat over a more extended band of color subcarrier sideband frequencies than was heretofore possible.

Another object of the present invention is to provide an improved color television receiver in a color television system of the subcarrier type whereby quadrature component distortion is greatly minimized.

Other objects and advantages of the present invention will be readily apparent to those skilled in the art upon a reading of the following detailed description and an inspection of the accompanying drawings in which.

Figure 1:
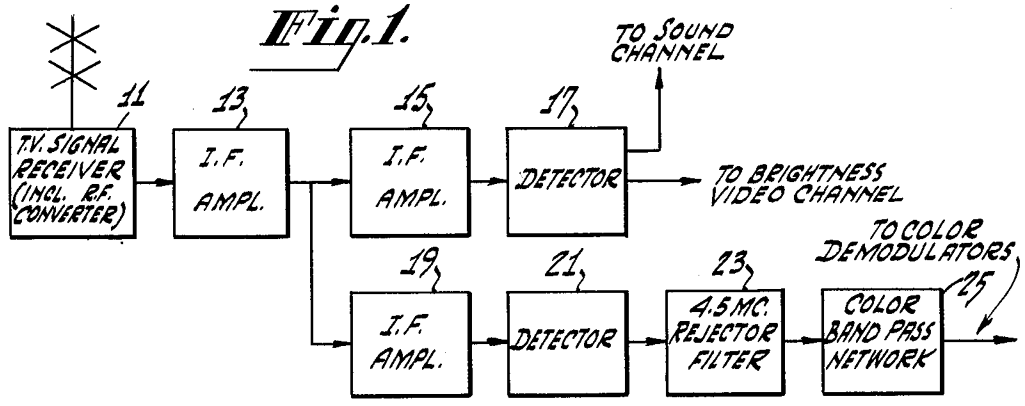
Fig. 1 illustrates in block form a portion of a color television receiver embodying the principles of the present invention.

Referring to Fig. 1 in greater detail, a television signal receiver 11 is illustrated as a source of signals for the receiving system. The signal receiver 11 may comprise conventional equipment, including means for selectively receiving a radiated picture carrier wave and its associated sound carrier, and the customary local oscillator and RF converter arrangement for heterodyning the received carrier to predetermined intermediate frequencies. The IF output of apparatus 11 is fed to a branched IF strip which includes a common IF amplifier portion 13, a brightness channel IF amplifier portion 15 and a color channel IF amplifier portion 19. The output of the brightness channel IF amplifier 15 is fed to a detector 17 which demodulates the carrier waves and supplies a broad band video frequency brightness signal to the brightness video channel of the color television receiver. A modulated sound carrier may also be derived from the detector 17 in accordance with well-known intercarrier sound techniques and applied to the sound channel of the color television receiver.

The output of the color channel IF amplifier 19 similarly is fed to a detector 21. The video frequency output of the detector 21 is fed through rejection filter 23, which sharply rejects the 4.5 mc. intercarrier sound signal, and is then fed to a color bandpass network 25, which has a passband encompassing the color subcarrier and its sidebands. The signal output of the color bandpass network 25 is then available for application to the appropriate color demodulators in the receiver.

Figure 2:
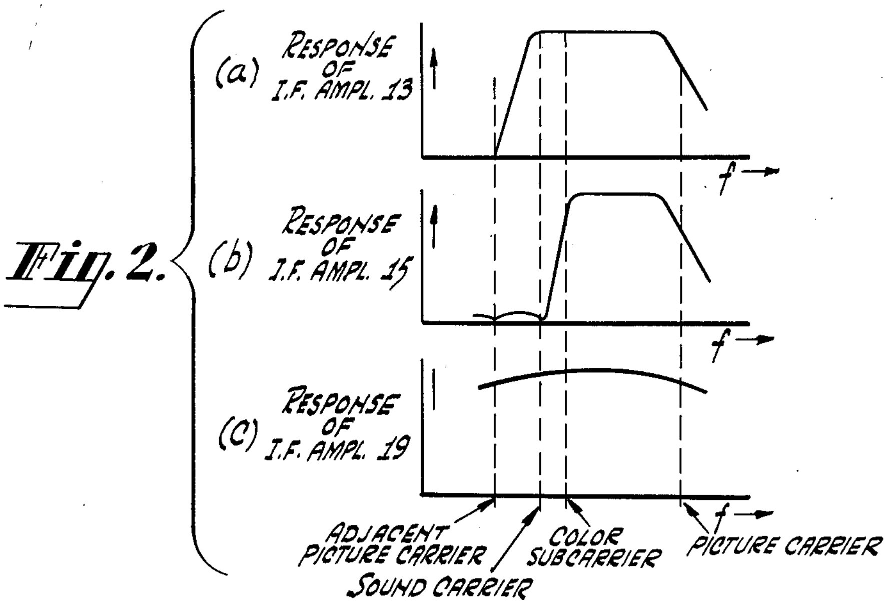
Fig. 2 illustrates graphically typical response characteristics for several IF amplifier components of the system illustrated in Fig. 1.

To aid in understanding the principles of the present invention, desirable response characteristics for the IF amplifiers 13, 15 and 19 have been illustrated in Fig. 2. As illustrated by curve (*a*) the response of the common IF amplifier 13 is essentially flat over a region including the color subcarrier, the sound carrier, and the frequencies therebetween. As illustrated by the curve (*c*), the response of the color channel IF amplifier 19 is also essentially flat throughout a region which includes the color subcarrier, the sound carrier and the frequencies therebetween. However, as illustrated by the curve (*b*), the response of the brightness channel IF amplifier 15 provides substantial attenuation of the sound carrier and is consequently not flat in the region surrounding the color subcarrier.

Considering the curve (*b*) in conjunction with the curve (*a*), it will be noted that for signals supplied to the brightness channel detector 17 the overall IF response characteristic corresponds to the more or less conventional IF characteristic, such as is presently utilized in the normal black-and-white television receiver. That is, the characteristic includes a sloping shoulder at the higher frequency extremity, with the picture carrier at a level of 50 per cent response from normal operation. This overall IF characteristic also includes the conventional sloping shoulder in the region approaching the sound carrier frequency, with dips representative of substantial attenuation at the sound carrier and adjacent picture carrier frequencies. The brightness channel is thus provided with the desirable features of the conventional black-and-white response characteristic, suitable for operation of intercarrier sound takeoff, with protection against appearance of the sound signal or picture information from an adjacent channel in brightness signal utilization circuits.

Figure 3:
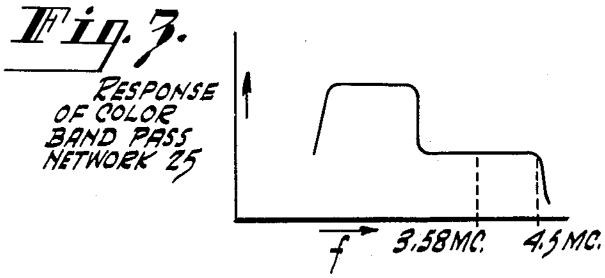
Fig. 3 illustrates graphically a typical response characteristic for a color bandpass component of the receiving system illustrated in Fig. 1.

However, taking curve (*c*) in conjunction with curve (*a*), it will be noted that for signals supplied to the color channel detector 21 an overall IF characteristic is provided which substantially differs from the conventional IF characteristic in that response is essentially flat over a wider region of frequencies extended through and including the sound carrier. Thus, corresponding upper and lower sidebands of the color subcarrier receive essentially equal amplitude response over an extremely wide region. The output of the color channel detector 21 therefore includes high level upper sidebands of the color subcarrier up to frequencies closely adjacent to the 4.5 mc. sound carrier (which is also at a high level). Sharp, narrow band attenuation is then provided by the rejection filter 23 for removing the 4.5 mc. sound carrier and its sidebands. The essentially sound-free video signal output derived from filter 23 is then passed through a color bandpass network 25, the response of which may be as indicated by the response curve of Fig. 3. As illustrated in Fig. 3 the response may be essentially flat for a range of frequency extending upwards from the color subcarrier to the 4.5 mc. sound carrier, and extending downwardly for a region of frequencies of corresponding bandwidth. As further illustrated by the curve of Fig. 3 the bandpass network 25 is also provided with an essentially flat response characteristic portion for the remaining range of frequencies in the downward direction to a limit approximately 2 mc. below the subcarrier frequency. The response in this range of frequencies, which corresponds to frequencies effectively producing only single sideband modulation of the subcarrier, is at a level approximately twice as high as the level of response for frequencies which produce double sideband modulation. This is in accordance with well-known principles for compensating for relative attenuation due to loss of one sideband.

The advantages of the present invention may now be readily appreciated. It will clearly be seen that the present invention provides signals for the color demodulators of the receivers in which relative amplitude distortion of upper and lower sidebands of the color subcarrier in the double sideband region is virtually eliminated. Thus quadrature component distortion which would otherwise result is avoided for all color modulating frequencies in a wide double sideband region. The attributes of the present invention are significant whatever the chosen extent of the double sideband region is (up to modulating frequency limit of approximately 800 kc. for a color subcarrier of approximately 3.58 mc.).

This desirable result is achieved without adversely effecting the brightness signal, without interfering with the normal operation of the sound channel and the sound carrier take-off, and without introduction of the sound signal or a high level beat between the sound carrier and color subcarrier into the brightness channel. The sound signal is satisfactorily prevented from appearance in the color demodulators by the use of the sharp rejection filter 23 after detection, when frequency stability of the sound carrier is such as to readily admit of use of such sharp cut-off filters as crystal filters or regenerative traps. While a high level beat between the color subcarrier and sound carrier may be expected to appear in the output of the color channel detector 21 due to the high level response to both in the common and color channel IF amplifiers 13 and 19, this beat of approximately .92 mc. cannot readily pass through the color bandpass network 25 which has a lower frequency cutoff appreciably above this frequency.

Figure 4:
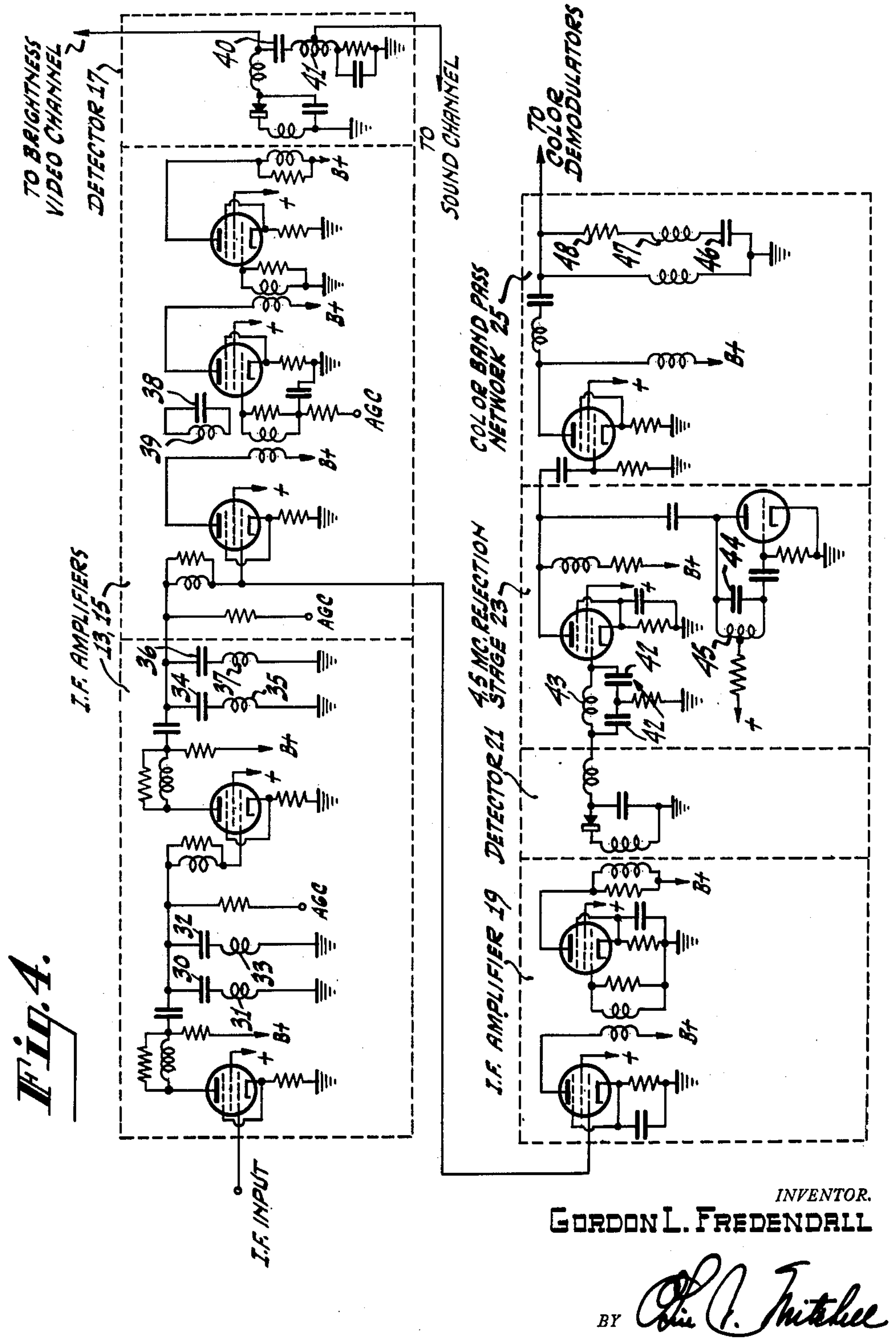
Fig. 4 illustrates schematically a representative form of the receiving system illustrated in block form in Fig. 1.

In Fig. 4 a typical schematic representation of the components illustrated by the blocks in Fig. 1 has been shown. It will be appreciated that this schematic diagram is given by way of example only, and that numerous variations in the circuit details may be effected without departing from the spirit of the present invention.

In Fig. 4 the common IF amplifier 13 is illustrated as including 2 stages of amplification, the outputs of each being shunted by respective pairs of series LC combinations 30—31, 32—33, 34—35, 36—37. The LC combinations 30—31 and 34—35 are each tuned to be series resonant at the frequency of the adjacent sound carrier, while the LC combinations 32—33 and 36—37 are each tuned to be series resonant at the frequency of the adjacent picture carrier. The other circuit constants of the common IF amplifier 13 are chosen such that the response of the amplifier is essentially flat over the wide range indicated by the flat portion of curve (*a*) of Fig. 2.

The brightness channel IF amplifier 15 is illustrated as comprising 3 stages of amplification, a trap 38—39 being associated with the intermediate stage and parallel tuned to the frequency of the associated sound carrier. The trap 38—39, which may be augmented by similar traps associated with the other stages of amplification, thus introduces the desired attenuation of the associated sound carrier in the brightness channel as indicated by the sloping shoulder and dip in the response curve (*b*) of Fig. 2. The detector 17 may be of conventional nature, as illustrated, supplying the recovered video signals to the brightness video channel of the receiver. The sound takeoff is at an intermediate point of the coil 41 which is series tuned with capacitor 40 to the 4.5 mc. intercarrier beat.

The color channel IF amplifier 19 is illustrated as comprising 2 stages of amplification, the circuit constants being chosen such that the response is essentially flat over a wide range of intermediate frequences extending through and including the associated sound carrier as illustrated by curve (*c*) of Fig. 2. The color channel detector 21 is also of conventional nature, supplying video frequency signals recovered from the modulated carrier to the color bandpass network 25 through the 4.5 mc. rejecting apparatus 23. The rejection apparatus 23 is shown as including a stage of video amplification, with a trap of the regenerative type included in the output circuit. The regenerative trap may take its well-known form, including a tank circuit 44—45 tuned to 4.5 mc. The regenerative trap supplies the very sharp attenuation characteristic desired to remove the 4.5 mc. sound carrier and its sidebands without appreciably affecting the higher sidebands of the color subcarrier. An additional filter including the inductance coil 43 shunted by capacitor 42 is illustrated in the input circuit of the video amplification stage. This additional filter is included in the illustrated embodiment to increase the attenuation of the 4.5 mc. carrier and to slightly widen the attenuation band. In another contemplated form of the invention, a crystal filter of well-known type may be substituted for the regenerative trap arrangement illustrated in Fig. 4.

The color bandpass network 25 is illustrated as including another stage of video amplification with an associated filter network having the desired characteristic to pass only those video frequencies occupied by the color subcarrier and its sidebands. The filter network thus provides a lower frequency cutoff sufficiently high to prevent passage of any high level beat between color subcarrier and sound carrier. The filter network includes the RLC branch 48—47—46, to introduce the step in the response curve illustrated in Fig. 3, the step being required because of the difference in gain necessary for signals in the single sideband region as contrasted with signals in the double sideband region. The color bandpass network 25 is preferably tuned for a midpoint of approximately 3 mc.

It should again be noted that the present invention is in no way limited to the particular circuit details shown in Fig. 4. Various circuit arrangements may be devised for the several components illustrated to achieve the desired response characteristics.

For a more complete understanding of the subcarrier type color television system, and of presently contemplated forms of receivers for such systems to which the improvements of the present invention are particularly applicable, reference may be made to articles such as "Optimum Utilization of the Radio Frequency Channel for Color Television" by R. D. Kell and A. C. Schroeder, "Principles and Development of Color Television Systems" by G. H. Brown and D. G. Luck, and "Colorimetric Analysis of RCA Color Television System" by D. W. Epstein, all appearing in the June 1953 issue of the "RCA Review." Also, further information as to typical color demodulators, with which the instant invention may be associated, may be found in the article entitled "Color Television Signal Receiver Demodulators" by D. H. Pritchard and R. N. Rhodes, appearing in the same issue of the "RCA Review."

Having thus described the invention, what is claimed is:

1. In a color television receiver adapted to receive and convert to intermediate frequencies composite color television signals including a picture carrier, a sound carrier and a color subcarrier, the combination comprising a common intermediate frequency amplifier, a brightness signal channel including a second intermediate frequency amplifier coupled to said common amplifier, and a color signal channel including a third intermediate frequency amplifier also coupled to said common amplifier, the response characteristic of said second amplifier being such as to provide substantial attenuation of said sound carrier intermediate frequency relative to said color subcarrier intermediate frequency, and the response characteristic of said third amplifier being such as to provide substantially equal response to said sound carrier intermediate frequency and to said color subcarrier intermediate frequency.

2. Apparatus in accordance with claim 1 wherein the frequency response characteristics of said common and color channel amplifiers are essentially flat over the region of intermediate frequencies extending between said color subcarrier intermediate frequency and said sound carrier intermediate frequency.

3. In a color television receiver adapted to receive and convert to intermediate frequencies composite color television signals including a picture carrier, a sound carrier and a color subcarrier, the combination comprising a common IF amplifier; a brightness signal channel including a second IF amplifier coupled to said common amplifier, and a signal detector coupled to said second IF amplifier; and a color signal channel including a third IF amplifier also coupled to said common IF amplifier, a second signal detector coupled to said third IF amplifier, filtering means coupled to said second signal detector for rejecting the beat between said picture and sound carriers, and additional filtering means coupled to said first filtering means having a passband which encompasses the color subcarrier and its sidebands.

4. Apparatus in accordance with claim 3 wherein the frequency response characteristic of said common IF amplifier is such as to provide substantially equivalent response to said sound carrier and said color subcarrier.

5. Apparatus in accordance with claim 4 wherein the frequency response characteristic of said third IF amplifier is also such as to provide substantially equivalent response to said sound carrier and said color subcarrier.

6. In a color television receiver including a brightness signal channel, a color signal channel and a composite signal source, the combination comprising a first intermediate frequency amplifier coupled to said source and common to both said brightness and color signal channels, a second intermediate frequency amplifier included in said brightness signal channel and coupled to said first amplifier, a third intermediate frequency amplifier included in said color signal channel and coupled to said first amplifier, said first and third amplifiers each having a relatively wider band of intermediate frequency response than said second amplifier.

7. In a color television receiver adapted to receive a composite color television signal including a modulated color subcarrier and accompanied by a modulated sound carrier, the combination comprising a brightness signal channel including a composite signal detector and a brightness signal utilization circuit, a color signal channel including an additional composite signal detector and a color signal utilization circuit, a common IF amplifier having an output circuit to which both said brightness and color signal channels are coupled, and respective sound rejection means included in said brightness and said color signal channels.

8. Apparatus in accordance with claim 7 wherein one of said sound rejection means precedes the detector in said brightness signal channel and the other of said sound rejection means is subsequent to the additional detector in said color signal channel.

9. Apparatus in accordance with claim 8 wherein said one sound rejection means comprises a brightness channel IF amplifier coupled to said common IF amplifier and having a frequency response characteristic providing substantial attenuation of said sound carrier relative to said color subcarrier.

10. Apparatus in accordance with claim 9 wherein said color signal channel includes a color channel IF amplifier coupled to said common IF amplifier and having a frequency response characteristic providing substantially equivalent response to said color subcarrier and said sound carrier at intermediate frequencies.

11. Apparatus in accordance with claim 10 wherein said common IF amplifier also has a frequency response characteristic providing substantially equivalent response to said color subcarrier and said sound carrier at intermediate frequencies.

12. Apparatus in accordance with claim 11 wherein said composite color television signal comprises a modulated picture carrier, and wherein said other sound rejection means comprises a filter in said color signal channel having a relatively narrow rejection band centered about a frequency corresponding to the frequency difference between said picture carrier and said sound carrier.

References Cited in the file of this patent

UNITED STATES PATENTS

| | | |
|---|---|---|
| 2,635,140 | Dome | Apr. 14, 1953 |
| 2,666,806 | Kalfaian | Jan. 19, 1954 |